US012559583B2

(12) United States Patent
Choi et al.

(10) Patent No.: US 12,559,583 B2
(45) Date of Patent: Feb. 24, 2026

(54) METHOD OF PREPARING GRAFT POLYMER

(71) Applicant: LG CHEM, LTD., Seoul (KR)

(72) Inventors: Jeong Su Choi, Daejeon (KR); Won Seok Lee, Daejeon (KR); Roo Da Lee, Daejeon (KR); Sang Hoo Park, Daejeon (KR); Jong Ju Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 815 days.

(21) Appl. No.: 17/442,416

(22) PCT Filed: Sep. 2, 2020

(86) PCT No.: PCT/KR2020/011776
§ 371 (c)(1),
(2) Date: Sep. 23, 2021

(87) PCT Pub. No.: WO2021/054652
PCT Pub. Date: Mar. 25, 2021

(65) Prior Publication Data

US 2022/0185933 A1 Jun. 16, 2022

(30) Foreign Application Priority Data

Sep. 18, 2019 (KR) ........................ 10-2019-0114888
Sep. 1, 2020 (KR) ........................ 10-2020-0110944

(51) Int. Cl.
*C08F 253/00* (2006.01)
*C08L 33/06* (2006.01)

(52) U.S. Cl.
CPC .......... *C08F 253/00* (2013.01); *C08L 33/062* (2013.01)

(58) Field of Classification Search
CPC ........ C08F 253/00; C08F 4/40; C08F 220/14; C08F 2/38; C08F 2/44; C08F 285/00; C08F 279/02; C08F 2500/21; C08F 2500/24; C08L 33/062; C08L 33/14; C08K 5/3475
See application file for complete search history.

(56) References Cited

U.S. PATENT DOCUMENTS

| | | | |
|---|---|---|---|
| 4,767,833 A | 8/1988 | Yumoto et al. | |
| 2006/0041062 A1 | 2/2006 | Choi et al. | |
| 2009/0012215 A1 | 1/2009 | Wada et al. | |
| 2013/0183536 A1 | 7/2013 | Kaneda et al. | |
| 2015/0005425 A1* | 1/2015 | Ahn ...................... | C08F 279/02 524/269 |
| 2016/0194427 A1 | 7/2016 | Kim et al. | |

FOREIGN PATENT DOCUMENTS

| | | |
|---|---|---|
| EP | 0404972 B1 | 2/1996 |
| JP | S59018716 A | 1/1984 |
| JP | H09194542 A | 7/1997 |
| JP | 2003192742 A | 7/2003 |
| JP | 2004346140 A | 12/2004 |
| JP | 2007238864 A | 9/2007 |
| JP | 2008174683 A | 7/2008 |
| JP | 2009235326 A | 10/2009 |
| KR | 10-2006-0016853 A | 2/2006 |
| KR | 10-2010-0110775 A | 10/2010 |
| KR | 10-2011-0030449 A | 3/2011 |
| KR | 10-2015-0139296 A | 12/2015 |
| WO | WO2007004670 A1 | 1/2007 |

OTHER PUBLICATIONS

Namieno et al., machine English translation of JP 2003-192742 (Year: 2003).*
Choi et al., machine English translation of KR 10-1489558 (Year: 2015).*
Extended European Search Report for related application No. 20865696.7, mailed Apr. 21, 2022.

* cited by examiner

*Primary Examiner* — Jessica M Roswell

(57) ABSTRACT

Provided is a method of preparing a graft polymer, which includes: adding a diene-based rubber polymer, a first monomer mixture including a (meth)acrylate-based monomer and an aromatic vinyl-based monomer, and a reactive ultraviolet (UV) stabilizer to a reactor and carrying out polymerization to prepare a composite rubber polymer; and graft-polymerizing a second monomer mixture including a (meth)acrylate-based monomer, an aromatic vinyl-based monomer, and a vinyl cyanide-based monomer to the composite rubber polymer to prepare a graft polymer, wherein the reactive UV stabilizer is added in an amount of 0.1 to 2 parts by weight based on 100 parts by weight of the sum of the diene-based rubber polymer, the first monomer mixture, and the second monomer mixture.

8 Claims, No Drawings

METHOD OF PREPARING GRAFT POLYMER

CROSS-REFERENCE TO RELATED APPLICATION

This application is a National phase of International Application No. PCT/KR2020/011776, which claims priority to and the benefit of Korean Patent Application No. 10-2019-0114888, filed on Sep. 18, 2019, and Korean Patent Application No. 10-2020-0110944, filed on Sep. 1, 2020, the disclosures of which are incorporated herein by reference in their entirety.

TECHNICAL FIELD

The present invention relates to a method of preparing a graft polymer, and more particularly, to a method of preparing a graft polymer using a reactive ultraviolet (UV) stabilizer.

BACKGROUND ART

Diene-based graft polymers obtained by graft-polymerizing aromatic vinyl-based monomers and vinyl cyanide-based monomers to diene-based rubber polymers have well-balanced properties in terms of impact strength, processability, and the like. Accordingly, the diene-based graft polymers have been variously used in automobile products, home appliances, office automation (OA) products, and the like. Recently, transparent materials have been developed in line with the diversification of designs, and techniques for imparting transparency to the diene-based graft polymers by introducing alkyl (meth)acrylate-based monomers are being developed.

The transparent diene-based graft polymers prepared by the above techniques may have excellent properties in terms of impact strength, processability, and the like, but cannot be used outdoors due to having low weather resistance, and even when used indoors, there may be a problem that discoloration occurs after long-term use. In order to improve the weather resistance, a method of adding an additive such as a UV stabilizer when preparing a thermoplastic resin composition has been proposed, but there is a limitation.

DISCLOSURE

Technical Problem

The present invention is directed to providing a graft polymer having excellent transparency, impact strength, and weather resistance.

Technical Solution

One aspect of the present invention provides a method of preparing a graft polymer, which includes: adding a diene-based rubber polymer, a first monomer mixture including a (meth)acrylate-based monomer and an aromatic vinyl-based monomer, and a reactive UV stabilizer to a reactor and carrying out polymerization to prepare a composite rubber polymer; and graft-polymerizing a second monomer mixture including a (meth)acrylate-based monomer, an aromatic vinyl-based monomer, and a vinyl cyanide-based monomer to the composite rubber polymer to prepare a graft polymer, wherein the reactive UV stabilizer is added in an amount of 0.1 to 2 parts by weight based on 100 parts by weight of the sum of the diene-based rubber polymer, the first monomer mixture, and the second monomer mixture.

Advantageous Effects

According to a preparing method of a graft polymer of the present invention, a graft polymer having excellent transparency, impact strength, and weather resistance can be prepared.

Modes of the Invention

Hereinafter, the present invention will be described in detail to facilitate understanding of the present invention.

Terms and words used in this specification and the claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technical spirit of the present invention.

In the present invention, a refractive index refers to an absolute refractive index of a material and may be recognized as a ratio of the speed of electromagnetic radiation in free space to the speed of the radiation in a material. Here, the radiation may be visible light having a wavelength of 450 nm to 680 nm and specifically visible light having a wavelength of 589.3 nm. The refractive index can be measured using a known method, that is, using an Abbe refractometer.

In the present invention, an average particle diameter can be measured using a dynamic light scattering method and more particularly using a Particle Sizing Systems Nicomp 380 instrument. In the present invention, the average particle diameter may refer to an arithmetic average particle diameter in the particle size distribution as measured by a dynamic light scattering method, that is, an average particle diameter in the scattering intensity distribution.

In the present invention, a diene-based rubber polymer may refer to a polymer obtained by crosslinking only diene-based monomers or crosslinking diene-based monomers and comonomers copolymerizable with the diene-based monomers. The diene-based monomer may be one or more selected from the group consisting of 1,3-butadiene, isoprene, chloroprene, and piperylene and is preferably 1,3-butadiene. Examples of the comonomer may include an aromatic vinyl-based monomer, a vinyl cyanide-based monomer, an olefin-based monomer, and the like. Examples of the diene-based rubber polymer may include a butadiene rubber polymer, a butadiene-styrene rubber polymer, a butadiene-acrylonitrile rubber polymer, and the like. The diene-based rubber polymer is preferably a butadiene rubber polymer having excellent impact strength and chemical resistance.

In the present invention, a (meth)acrylate-based monomer may be a $C_1$-$C_{10}$ alkyl (meth)acrylate-based monomer, and the $C_1$-$C_{10}$ alkyl (meth)acrylate-based monomer may be one or more selected from the group consisting of methyl (meth)acrylate, ethyl (meth)acrylate, propyl (meth)acrylate, butyl (meth)acrylate, heptyl (meth)acrylate, hexyl (meth) acrylate, 2-ethylhexyl (meth)acrylate, and decyl (meth)acrylate and is preferably one or more selected from the group consisting of methyl methacrylate and butyl acrylate.

In the present invention, an aromatic vinyl-based monomer may be one or more selected from styrene, α-methylstyrene, α-ethylstyrene, and p-methylstyrene and is preferably styrene.

In the present invention, a vinyl cyanide-based monomer may be one or more selected from the group consisting of acrylonitrile, methacrylonitrile, phenyl acrylonitrile, and α-chloroacrylonitrile and is preferably acrylonitrile.

In the present invention, a $C_1$-$C_{10}$ linear alkyl group may be a $C_1$-$C_{10}$ linear or branched alkyl group and is preferably a $C_1$-$C_3$ linear or branched alkyl group. The $C_1$-$C_{10}$ linear alkyl group may be a methyl group, an ethyl group, a propyl group, an isopropyl group, a butyl group, an isobutyl group, a heptyl group, an isoheptyl group, a hexyl group, or an isohexyl group and is preferably a methyl group.

In the present invention, a $C_1$-$C_{10}$ linear alkylene group may be a $C_1$-$C_{10}$ linear or branched alkylene group and is preferably a $C_1$-$C_3$ linear or branched alkylene group. The $C_1$-$C_{10}$ linear alkylene group may refer to the $C_1$-$C_{10}$ linear alkyl group with two binding sites, that is, a divalent group.

1. Method of Preparing Graft Polymer

A method of preparing a graft polymer according to one embodiment of the present invention includes: 1) adding a diene-based rubber polymer, a first monomer mixture including a (meth)acrylate-based monomer and an aromatic vinyl-based monomer, and a reactive UV stabilizer to a reactor and carrying out polymerization to prepare a composite rubber polymer; and 2) graft-polymerizing a second monomer mixture including a (meth)acrylate-based monomer, an aromatic vinyl-based monomer, and a vinyl cyanide-based monomer to the composite rubber polymer to prepare a graft polymer, wherein the reactive UV stabilizer is added in an amount of 0.1 to 2 parts by weight based on 100 parts by weight of the sum of the diene-based rubber polymer, the first monomer mixture, and the second monomer mixture.

Hereinafter, the method of preparing a graft polymer according to one embodiment of the present invention will be described in detail.

1) Formation of Composite Rubber Polymer

First, a diene-based rubber polymer, a first monomer mixture including a (meth)acrylate-based monomer and an aromatic vinyl-based monomer, and a reactive UV stabilizer are added to a reactor and polymerized, and thus a composite rubber polymer is prepared.

The reactive UV stabilizer is a UV stabilizer having double bonds capable of participating in polymerization, and when an appropriate amount thereof is added in the step of preparing the composite rubber polymer, the reactive UV stabilizer is able to bond directly to the composite rubber polymer chain and thus greatly improves weather resistance. In addition, since the reactive UV stabilizer is added in the step of forming the composite rubber polymer, the reactive UV stabilizer may have no or only a minimal effect on the formation of a diene-based rubber polymer and a shell. Accordingly, the impact strength and transparency of a graft polymer may not be affected or only minimally affected.

The reactive UV stabilizer may be added in an amount of 0.1 parts by weight to 2 parts by weight and preferably 0.5 parts by weight to 1.2 parts by weight based on 100 parts by weight of the sum of the diene-based rubber polymer, the first monomer mixture, and the second monomer mixture. When this range is satisfied, weather resistance can be greatly improved while transparency and impact strength are minimally affected. When the addition amount of the reactive UV stabilizer is less than the range, the effect of improving weather resistance may be insignificant, and when the addition amount of the reactive UV stabilizer exceeds the range, transparency and impact strength may be lowered, making a graft polymer unsuitable for use as a transparent material.

The reactive UV stabilizer may be a compound represented by Chemical Formula 1:

<Chemical Formula 1>

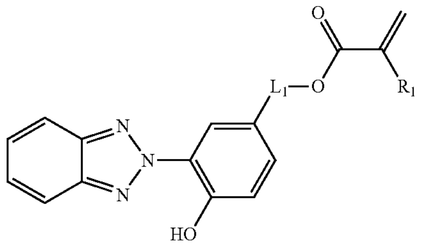

In the Chemical Formula 1, $R_1$ is hydrogen or a $C_1$-$C_{10}$ alkyl group, and $L_1$ is a direct bond or a $C_1$-$C_{10}$ alkylene group.

The reactive UV stabilizer may be one or more selected from the group consisting of 2-[2'-hydroxy-5'-2-(acryloyloxy)phenyl]-2H-benzotriazole, 2-[2'-hydroxy-5'-2-(methacryloyloxy)phenyl]-2H-benzotriazole, 2-[2'-hydroxy-5'-[2-(acryloyloxy)methyl]phenyl]-2H-benzotriazole, 2-[2'-hydroxy-5'-[2-(methacryloyloxy)methyl]phenyl]-2H-benzotriazole, 2-[2'-hydroxy-5'-[2-(acryloyloxy)ethyl]phenyl]-2H-benzotriazole, 2-[2'-hydroxy-5'-[2-(methacryloyloxy)ethyl]phenyl]-2H-benzotriazole, 2-[2'-hydroxy-5'-[2-(acryloyloxy)propyl]phenyl]-2H-benzotriazole, 2-[2'-hydroxy-5'-[2-(methacryloyloxy)propyl]phenyl]-2H-benzotriazole, 2-[2'-hydroxy-5'-[2-(acryloyloxy)butyl]phenyl]-2H-benzotriazole, 2-[2'-hydroxy-5'-[2-(methacryloyloxy)butyl]phenyl]-2H-benzotriazole, 2-[2'-hydroxy-5'-[2-(acryloyloxy)hexyl]phenyl]-2H-benzotriazole, and 2-[2'-hydroxy-5'-[2-(methacryloyloxy)hexyl]phenyl]-2H-benzotriazole and is preferably 2-[2'-hydroxy-5'-[2-(methacryloyloxy)ethyl]phenyl]-2H-benzotriazole.

The diene-based rubber polymer may have an average particle diameter of 200 to 400 nm and preferably 250 to 450 nm. When this condition is satisfied, a graft polymer having excellent impact strength can be prepared.

The diene-based rubber polymer may be added to the reactor in an amount of 7 to 30 parts by weight, preferably 10 to 30 parts by weight, and more preferably 15 to 25 parts by weight based on 100 parts by weight of the sum of the diene-based rubber polymer, the first monomer mixture, and the second monomer mixture. When this condition is satisfied, a graft polymer having excellent impact strength and chemical resistance can be prepared. When the addition amount of the diene-based rubber polymer is less than the above-described range, impact strength at room temperature and low temperature may be lowered. When the addition amount of the diene-based rubber polymer exceeds the above-described range, since the amount of the (meth) acrylate-based monomer added in the preparing process of the composite rubber polymer becomes relatively small, the weather resistance of a graft polymer may be lowered.

The first monomer mixture may be added to the reactor in an amount of 10 to 50 parts by weight, preferably 30 to 50 parts by weight, and more preferably 35 to 45 parts by weight based on 100 parts by weight of the sum of the diene-based rubber polymer, the first monomer mixture, and the second monomer mixture. When this condition is satisfied, a graft polymer having excellent weather resistance can be prepared. When the addition amount of the first monomer mixture is less than the above-described range, since the amount of the composite rubber polymer included in a graft polymer increases, mechanical properties such as tensile strength and flexural strength may be degraded, and transparency may be lowered.

The first monomer mixture may include the (meth)acrylate-based monomer and the aromatic vinyl-based monomer in a weight ratio of 70:30 to 50:50 and preferably 65:35 to 55:45. When this range is satisfied, a graft polymer having excellent weather resistance can be prepared.

In order to further improve weather resistance, the first monomer mixture preferably includes an acrylate-based monomer and an aromatic vinyl-based monomer and more preferably includes butyl acrylate and styrene.

Meanwhile, the polymerization performed in the formation of the composite rubber polymer may be emulsion polymerization, and in this case, one or more selected from the group consisting of an initiator, an emulsifier, a crosslinking agent, a grafting agent, and an electrolyte may be additionally added to the reactor.

The initiator may be one or more selected from the group consisting of t-butyl peroxide, cumene hydroperoxide, diisopropylbenzene peroxide, potassium persulfate, sodium persulfate, and ammonium persulfate and is preferably cumene hydroperoxide.

The emulsifier may be one or more selected from the group consisting of fatty acid soap, potassium oleate, sodium oleate, sodium dicyclohexyl sulfosuccinate, sodium dihexyl sulfosuccinate, sodium di-2-ethylhexyl sulfosuccinate, potassium di-2-ethylhexyl sulfosuccinate, sodium dioctyl sulfosuccinate, sodium dodecyl sulfate, sodium dodecyl benzene sulfate, sodium octadecyl sulfate, sodium oleic sulfate, sodium dodecyl sulfate, potassium octadecyl sulfate, potassium rosinate, and sodium rosinate and is preferably sodium dioctyl sulfosuccinate.

The crosslinking agent may be one or more selected from the group consisting of ethylene glycol dimethacrylate, diethylene glycol dimethacrylate, triethylene glycol dimethacrylate, 1,3-butanediol dimethacrylate, 1,6-hexanediol dimethacrylate, neopentyl glycol dimethacrylate, trimethylolpropane trimethacrylate, and trimethylolmethane tetraacrylate and is preferably ethylene glycol dimethacrylate.

The grafting agent may be one or more selected from the group consisting of allyl methacrylate, triallyl isocyanurate, triallylamine, and diallylamine and is preferably allyl methacrylate.

The electrolyte may be one or more selected from the group consisting of KCl, NaCl, KOH, $KHCO_3$, $NaHCO_3$, $K_2CO_3$, $Na_2CO_3$, $KHSO_3$, $NaHSO_3$, $K_4P_2O_7$, $Na_4P_2O_7$, $K_3PO_4$, $Na_3PO_4$, $K_2HPO_4$, and $Na_2HPO_4$ and is preferably one or more selected from the group consisting of KOH and $K_2CO_3$.

Meanwhile, the composite rubber polymer may have an average particle diameter of 250 to 500 nm and preferably 280 to 450 nm. When this condition is satisfied, the transparency and mechanical properties of a graft polymer can be improved.

2) Preparation of Graft Polymer

A second monomer mixture including a (meth)acrylate-based monomer, an aromatic vinyl-based monomer, and a vinyl cyanide-based monomer is graft-polymerized to the above-described composite rubber polymer, and thus a graft polymer is prepared.

The second monomer mixture may be added to the reactor in an amount of 20 to 70 parts by weight, preferably 30 to 50 parts by weight, and more preferably 35 to 45 parts by weight based on 100 parts by weight of the sum of the diene-based rubber polymer, the first monomer mixture, and the second monomer mixture. When this condition is satisfied, a graft polymer having excellent transparency, appearance characteristics, and impact strength can be prepared. When the addition amount of the second monomer mixture is less than the above-described range, appearance characteristics may be degraded, and in particular, flow marks and the like may occur. When the addition amount of the second monomer mixture exceeds the above-described range, impact strength may be significantly lowered.

The second monomer mixture may include the (meth)acrylate-based monomer at 60 to 80 wt %, the aromatic vinyl-based monomer at 15 to 35 wt %, and the vinyl cyanide-based monomer at 1 to 7 wt %, and preferably includes the (meth)acrylate-based monomer at 65 to 75 wt %, the aromatic vinyl-based monomer at 20 to 30 wt %, and the vinyl cyanide-based monomer at 3 to 7 wt %. When these ranges are satisfied, processability and chemical resistance can be improved while transparency is maintained.

In order to further improve weather resistance, the second monomer mixture preferably includes a methacrylate-based monomer and an aromatic vinyl-based monomer and more preferably includes methyl methacrylate, styrene, and acrylonitrile.

Meanwhile, the polymerization performed in the preparation of the graft polymer may be emulsion polymerization, and in this case, one or more selected from the group consisting of an initiator, an emulsifier, an oxidation-reduction catalyst, and a molecular-weight regulator may be additionally added to the reactor.

Types of the initiator and the emulsifier have been described above.

The oxidation-reduction catalyst may be one or more selected from the group consisting of sodium formaldehyde sulfoxylate, sodium ethylenediaminetetraacetate, ferrous sulfate, dextrose, sodium pyrophosphate, anhydrous sodium pyrophosphate, and sodium sulfate and is preferably one or more selected from the group consisting of ferrous sulfate, dextrose, and sodium pyrophosphate.

The molecular-weight regulator may be one or more selected from the group consisting of an α-methyl styrene dimer, t-dodecyl mercaptan, n-dodecyl mercaptan, octyl mercaptan, carbon tetrachloride, methylene chloride, methylene bromide, tetraethylthiuram disulfide, dipentamethylene thiuram disulfide, and diisopropyl xanthogen disulfide and is preferably t-dodecyl mercaptan.

Meanwhile, in order for the graft polymer to have transparency, it is preferred that the difference in refractive index among the diene-based rubber polymer, the composite rubber polymer, and the shell is 0.01 or less, and it is more preferred that there is no difference in refractive index.

In addition, the graft polymer may have a refractive index of 1.51 to 1.52 and preferably 1.515 to 1.517. When this condition is satisfied, a graft polymer having excellent transparency can be prepared.

2. Thermoplastic Resin Composition

A thermoplastic resin composition according to another embodiment of the present invention may include the graft polymer prepared by the preparing method according to one embodiment of the present invention; and a matrix polymer which is a polymer of a third monomer mixture including a (meth)acrylate-based monomer, an aromatic vinyl-based monomer, and a vinyl cyanide-based monomer.

The difference in refractive index between the graft polymer and the matrix polymer may be 0.01 or less, and it is preferred that there is no difference in refractive index.

When this condition is satisfied, a thermoplastic-resin molded article having excellent transparency can be prepared.

The third monomer mixture may include the (meth) acrylate-based monomer at 40 to 75 parts by weight, the aromatic vinyl-based monomer at 15 to 40 parts by weight, and the vinyl cyanide-based monomer at 1 to 20 parts by weight, and preferably includes the (meth)acrylate-based monomer at 55 to 70 parts by weight, the aromatic vinyl-based monomer at 20 to 30 parts by weight, and the vinyl cyanide-based monomer at 5 to 15 parts by weight. When this condition is satisfied, a matrix polymer having excellent transparency, chemical resistance, scratch resistance, and processability can be formed.

The thermoplastic resin composition may include the graft polymer and the matrix polymer in a weight ratio of 25:75 to 75:25 and preferably 50:50 to 25:75.

Hereinafter, exemplary embodiments of the present invention will be described in detail so that those of ordinary skill in the art can easily carry out the present invention. However, it should be understood that the present invention can be implemented in various forms and that the exemplary embodiments are not intended to limit the present invention thereto.

PREPARING EXAMPLE 1

Polymerization was performed while continuously adding a polymerization solution containing 63.36 parts by weight of methyl methacrylate, 24.64 parts by weight of styrene, 12 parts by weight of acrylonitrile, 30 parts by weight of toluene, and 0.15 parts by weight of t-dodecyl mercaptan to a reactor at a constant rate so that the average polymerization time was three hours, and the polymerization temperature was maintained at 148° C. The polymerization product discharged from the reactor was heated in a preheating bath, and unreacted monomers were volatilized in a volatilization bath. Subsequently, the resultant was extruded in an extruder set at 210° C., and thereby a methylstyrene-acrylonitrile (MSAN) polymer (refractive index: 1.516) in pellet form was obtained.

Example 1

<Preparation of Graft Polymer Powder>

Polymerization was performed while continuously adding 20 parts by weight(based on solid content) of a butadiene rubber polymer latex (PBL; gel content: 70%, average particle diameter: 300 nm), 24 parts by weight of butyl acrylate (BA), 16 parts by weight of styrene (S), 100 parts by weight of ion-exchanged water, a reactive UV stabilizer (RUVA93 commercially available from Otsuka Chemical Co., Ltd.) in an amount as shown below in Tables, 0.1 parts by weight of cumene hydroperoxide, 0.01 parts by weight of sodium ethylenediaminetetraacetate, 0.04 parts by weight of sodium formaldehyde sulfoxylate, 0.0001 parts by weight of ferrous sulfate, 0.7 parts by weight of sodium dioctyl sulfosuccinate, 0.4 parts by weight of ethylene glycol dimethacrylate, 0.1 parts by weight of allyl methacrylate, and 0.1 parts by weight of $NaHCO_3$ to a reactor at a constant rate and 70° C. for three hours. Subsequently, after raising the temperature of the reactor to 80° C., polymerization was performed for one hour, and thereby a composite rubber polymer latex was obtained.

Polymerization was performed while continuously adding 28 parts by weight of methyl methacrylate (MMA), 10 parts by weight of styrene (S), 2 parts by weight of acrylonitrile (AN), 0.1 parts by weight of cumene hydroperoxide, 0.01 parts by weight of sodium ethylenediaminetetraacetate, 0.04 parts by weight of sodium formaldehyde sulfoxylate, 0.001 parts by weight of ferrous sulfate, 0.5 parts by weight of sodium oleate, and 0.4 parts by weight of t-dodecyl mercaptan to the composite rubber polymer latex at a constant rate and 75° C. for five hours. Subsequently, after raising the temperature of the reactor to 80° C., aging was performed for one hour and then polymerization was terminated, and thereby a graft polymer latex was obtained.

The graft polymer latex was coagulated using an aqueous calcium chloride solution and then aged, washed, dehydrated, and dried, and thereby a graft polymer powder was obtained.

<Preparation of Thermoplastic Resin Composition>

A thermoplastic resin composition was prepared by uniformly mixing 35 parts by weight of the graft polymer powder and 65 parts by weight of the MSAN polymer of Preparing Example 1.

Examples 2 to 4

A graft polymer powder and a thermoplastic resin composition were prepared in the same manner as in Example 1 except that a reactive UV stabilizer (RUVA93 commercially available from Otsuka Chemical Co., Ltd.) was added to a reactor in an amount as shown below in Tables.

Example 5

<Preparation of Graft Polymer Powder>

A graft polymer powder was prepared in the same manner as in Example 1.

<Preparation of Thermoplastic Resin Composition>

A thermoplastic resin composition was prepared by uniformly mixing 45 parts by weight of the graft polymer powder and 55 parts by weight of the MSAN polymer of Preparing Example 1.

Comparative Examples 1 and 2

A graft polymer powder and a thermoplastic resin composition were prepared in the same manner as in Example 1 except that a reactive UV stabilizer (RUVA93 commercially available from Otsuka Chemical Co., Ltd.) was added to a reactor in an amount as shown below in Tables.

Comparative Example 3

<Preparation of Graft Polymer Powder>

Polymerization was performed while continuously adding 20 parts by weight(based on solid content) of a butadiene rubber polymer latex (PBL; gel content: 70%, average particle diameter: 300 nm), 17.5 parts by weight of butyl acrylate (BA), 12.5 parts by weight of styrene (S), 100 parts by weight of ion-exchanged water, 0.06 parts by weight of potassium persulfate, 0.5 parts by weight of sodium dioctyl sulfosuccinate, 0.28 parts by weight of ethylene glycol dimethacrylate, 0.1 parts by weight of allyl methacrylate, and 0.1 parts by weight of $NaHCO_3$ to a reactor at a constant rate and 70° C. for three hours. Subsequently, after raising the temperature of the reactor to 80° C., polymerization was performed for one hour, and thereby a composite rubber polymer latex was obtained.

Polymerization was performed while continuously adding 34.56 parts by weight of methyl methacrylate (MMA), styrene (S) at 13.44 parts by weight, acrylonitrile (AN) at 2 parts by weight, 0.1 parts by weight of cumene hydroperoxide, 0.01 parts by weight of sodium ethylenediaminetetraacetate, 0.04 parts by weight of sodium formaldehyde sulfoxylate, 0.001 parts by weight of ferrous sulfate, 0.5 parts by weight of sodium oleate, and 0.5 parts by weight of t-dodecyl mercaptan to the composite rubber polymer latex at a constant rate and 75° C. for five hours. Subsequently, after raising the temperature of the reactor to 80° C., aging was performed for one hour and then polymerization was terminated, and thereby a graft polymer latex was obtained.

The graft polymer latex was coagulated using an aqueous calcium chloride solution and then aged, washed, dehydrated, and dried, and thereby a graft polymer powder was obtained.

<Preparation of Thermoplastic Resin Composition>

A thermoplastic resin composition was prepared by uniformly mixing 40 parts by weight of the graft polymer powder and 60 parts by weight of the MSAN polymer of Preparing Example 1.

Comparative Example 4

<Preparation of Graft Polymer Powder>

Polymerization was performed while continuously adding 50 parts by weight(based on solid content) of a butadiene rubber polymer latex (PBL; gel content: 70%, average particle diameter: 300 nm), 35.5 parts by weight of methyl methacrylic acid, 12.5 parts by weight of styrene, 2 parts by weight of acrylonitrile, 0.1 parts by weight of cumene hydroperoxide, 0.5 parts by weight of sodium oleate, 0.1 parts by weight of sodium ethylenediaminetetraacetate, 0.04 parts by weight of sodium formaldehyde sulfoxylate, and 0.001 parts by weight of ferrous sulfate to a reactor at a constant rate and 75° C. for five hours. Subsequently, after raising the temperature of the reactor to 80° C., aging was performed for one hour and then polymerization was terminated, and thereby a graft polymer latex was obtained.

The graft polymer latex was coagulated using an aqueous calcium chloride solution and then aged, washed, dehydrated, and dried, and thereby a graft polymer powder was obtained.

<Preparation of Thermoplastic Resin Composition>

A thermoplastic resin composition was prepared by uniformly mixing 40 parts by weight of the graft polymer powder and 60 parts by weight of the MSAN polymer of Preparing Example 1.

Comparative Example 5

<Preparation of Diene-Based Rubber Polymer>

90 parts by weight of ion-exchanged water, 75 parts by weight of 1,3-butadiene (BD), 3.5 parts by weight of a reactive UV stabilizer (RUVA93 commercially available from Otsuka Chemical Co., Ltd.), 1.2 parts by weight of potassium rosinate, 0.8 parts by weight of potassium oleate, 1.0 part by weight of $K_2CO_3$, 0.4 parts by weight of t-dodecyl mercaptan, and 0.5 parts by weight of potassium persulfate were batch-added to a nitrogen-substituted polymerization reactor. After raising the temperature of the reactor to 70° C., polymerization was initiated.

Subsequently, when a polymerization conversion rate of about 35% was reached, 25 parts by weight of 1,3-butadiene (BD) and 0.15 parts by weight of potassium persulfate were batch-added to the reactor, and thus polymerization was continued.

Polymerization was performed while raising the temperature of the reactor to 80° C. when a polymerization conversion rate of about 60% was reached, and the polymerization was terminated when a polymerization conversion rate of 90% was reached, and thereby a butadiene rubber polymer latex (gel content: 70%, average particle diameter: 300 nm) was obtained.

<Preparation of Graft Polymer Powder>

Polymerization was performed while continuously adding 20 parts by weight(based on solid content) of the butadiene rubber polymer latex, 24 parts by weight of butyl acrylate (BA), 16 parts by weight of styrene (S), 100 parts by weight of ion-exchanged water, 0.1 parts by weight of cumene hydroperoxide, 0.01 parts by weight of sodium ethylenediaminetetraacetate, 0.04 parts by weight of sodium formaldehyde sulfoxylate, 0.0001 parts by weight of ferrous sulfate, 0.7 parts by weight of sodium dioctyl sulfosuccinate at, 0.4 parts by weight of ethylene glycol dimethacrylate, 0.1 parts by weight of allyl methacrylate, and 0.1 parts by weight of $NaHCO_3$ to a reactor at a constant rate and 70° C. for three hours. Subsequently, after raising the temperature of the reactor to 80° C., polymerization was performed for one hour, and thereby a composite rubber polymer latex was obtained.

Polymerization was performed while continuously adding 28 parts by weight of methyl methacrylate (MMA), 10 parts by weight of styrene (S), 2 parts by weight of acrylonitrile (AN), 0.1 parts by weight of cumene hydroperoxide, 0.01 parts by weight of sodium ethylenediaminetetraacetate, 0.04 parts by weight of sodium formaldehyde sulfoxylate, 0.001 parts by weight of ferrous sulfate, 0.5 parts by weight of sodium oleate, and 0.4 parts by weight of t-dodecyl mercaptan to the composite rubber polymer latex at a constant rate and 75° C. for five hours. Subsequently, after raising the temperature of the reactor to 80° C., aging was performed for one hour and then polymerization was terminated, and thereby a graft polymer latex was obtained.

The graft polymer latex was coagulated using an aqueous calcium chloride solution and then aged, washed, dehydrated, and dried, and thereby a graft polymer powder was obtained.

<Preparation of Thermoplastic Resin Composition>

A thermoplastic resin composition was prepared by uniformly mixing 35 parts by weight of the graft polymer powder and 65 parts by weight of the MSAN polymer of Preparing Example 1.

Experimental Example 1

A property of the composite rubber polymers of Examples and Comparative Examples was evaluated by the method described below, and the results are shown below in Tables.

① Average particle diameter (nm): Measured by a dynamic light scattering method using a Particle Sizing Systems Nicomp 380 instrument.

Experimental Example 2

A property of the graft polymer powders of Examples and Comparative Examples was evaluated by the method described below, and the results are shown in Tables 1 and 2.

② Refractive index: Measured with an Abbe refractometer after irradiating a graft polymer powder with 589.3 nm visible light.

Experimental Example 3

After uniformly mixing 100 parts by weight of the thermoplastic resin compositions of Examples and Comparative Examples, 0.2 parts by weight of ethylene bis(stearate), 0.2 parts by weight of IR1076 and 0.1 parts by weight of Tinuvin 770 (commercially available from BASF SE), the mixtures were extruded and injection-molded to prepare specimens. Properties of the specimens were evaluated by the methods described below, and the results are shown below in Tables 1 and 2.

③ Haze value (%): Measured in accordance with ASTM 1003.

④ Notched Izod impact strength (kgf cm/cm, ¼ inch): Measured at 25° C. in accordance with ASTM D256.

⑤ Weather resistance: The weather resistance was evaluated by calculating, using the below equation, the color difference of a specimen before and after 500 hours of storage using ATLAS UV2000.

Meanwhile, weather resistance evaluation conditions were as follows:

Light source: Fluorescent UV lamps (40 W, UVA 340 lamp)

Irradiance: 0.55 W/$m^2$ (340 nm)

Black panel temperature: 60° C.

$$\Delta E=\sqrt{(L'-L_0)^2+(a'-a_0)^2+(b'-b_0)^2}$$

In the above equation, L', a', and b' are the L, a, and b values measured in the CIE LAB color coordinate system after storing the specimen for 500 hours, and $L_0$, $a_0$, and $b_0$ are the L, a, and b values measured in the CIE LAB color coordinate system before storage.

TABLE 1

| Classification | | Comparative Example 1 | Examples 1 | 2 | 3 | 4 | Comparative Example 2 |
|---|---|---|---|---|---|---|---|
| Composite rubber polymer latex (parts by weight) | PBL | 20 | 20 | 20 | 20 | 20 | 20 |
| | BA | 24 | 24 | 24 | 24 | 24 | 24 |
| | S | 16 | 16 | 16 | 16 | 16 | 16 |
| | Reactive UV stabilizer | 0.05 | 0.3 | 0.7 | 1.5 | 2 | 3 |
| | Average particle diameter (nm) | 410 | 410 | 410 | 410 | 410 | 410 |
| Graft polymer powder (parts by weight) | MMA | 28 | 28 | 28 | 28 | 28 | 28 |
| | S | 10 | 10 | 10 | 10 | 10 | 10 |
| | AN | 2 | 2 | 2 | 2 | 2 | 2 |
| | Refractive index | 1.516 | 1.516 | 1.516 | 1.516 | 1.516 | 1.516 |
| Thermoplastic resin composition | Graft polymer powder (parts by weight) | 35 | 35 | 35 | 35 | 35 | 35 |
| | MSAN polymer of Preparing Example 1 (parts by weight) | 65 | 65 | 65 | 65 | 65 | 65 |
| | Haze value | 1.8 | 1.8 | 1.9 | 2.1 | 2.2 | 2.5 |
| | Impact strength | 9 | 8.8 | 8.9 | 8.7 | 8.7 | 8.6 |
| | Weather resistance | 4.2 | 1.5 | 0.9 | 0.8 | 0.6 | 0.6 |

TABLE 2

| Classification | | Example 5 | Comparative Example 3 | Comparative Example 4 | Comparative Example 5 |
|---|---|---|---|---|---|
| Preparation of diene-based rubber polymer latex (parts by weight) | BD | — | — | — | 100 |
| | Reactive UV stabilizer | — | — | — | 3.5 |
| | Average particle diameter (nm) | — | — | — | 300 |
| Composite rubber polymer latex (parts by weight) | PBL | 20 | 20 | 50 | 20 |
| | BA | 24 | 17.5 | 0 | 24 |
| | S | 16 | 12.5 | 0 | 16 |
| | Reactive UV stabilizer | 0.7 | 0 | 0 | 0 |
| | Average particle diameter (nm) | 410 | 390 | 300 | 410 |
| Graft polymer powder (parts by weight) | MMA | 28 | 34.56 | 35.5 | 28 |
| | S | 10 | 13.44 | 12.5 | 10 |
| | AN | 12 | 2 | 2 | 12 |
| | Refractive index | 1.516 | 1.518 | 1.516 | 1.516 |
| Thermoplastic resin composition | Graft polymer powder (parts by weight) | 45 | 40 | 40 | 35 |
| | MSAN polymer (parts by weight) | 55 | 60 | 60 | 65 |
| | Haze value | 2.1 | 2.1 | 1.9 | 2.5 |
| | Impact strength | 12.3 | 8.3 | 18.1 | 8.5 |
| | Weather resistance | 1 | 3.9 | 7.2 | 2.1 |

Referring to Tables 1 and 2, in the case of Examples 1 to 5 in which an appropriate amount of a reactive UV stabilizer was used, it can be seen that all of transparency, impact strength, and weather resistance were excellent. On the other hand, in the case of Comparative Example 1 in which a small amount of a reactive UV stabilizer was used, weather resistance was significantly lowered. In the case of Comparative Example 2 in which an excessive amount of a reactive UV stabilizer was used, since transparency was lowered, the graft polymer is not appropriate as a transparent material. In the case of Comparative Example 3 in which a reactive UV stabilizer was not used, it can be seen that weather resistance was significantly lowered. In the case of Comparative Example 4 in which a reactive UV stabilizer was not used and a diene-based rubber polymer rather than a composite rubber polymer was used for preparing a graft polymer, it can be seen that weather resistance was significantly lowered. In the case of Comparative Example 5 in which a reactive UV stabilizer was used for preparing a diene-based rubber polymer latex, it can be seen that transparency, impact resistance, and weather resistance were lowered. In the case of Comparative Example 5, as compared to Example 2, in which the amount of a reactive UV stabilizer contained in a graft copolymer was the same and only the timing of addition of the reactive UV stabilizer was different, it can be seen that transparency, impact resistance, and weather resistance were lowered.

The invention claimed is:

1. A method of preparing a graft polymer, comprising:

adding a diene-based rubber polymer, a first monomer mixture including a (meth)acrylate-based monomer and an aromatic vinyl-based monomer, and a reactive ultraviolet (UV) stabilizer to a reactor and carrying out polymerization to prepare a composite rubber polymer; and graft-polymerizing a second monomer mixture including a (meth)acrylate-based monomer, an aromatic vinyl-based monomer, and a vinyl cyanide-based monomer to the composite rubber polymer to prepare the graft polymer, wherein the first monomer mixture includes the (meth) acrylate-based monomer and the aromatic vinyl-based monomer in a weight ratio of 70:30 to 50:50, and wherein, based on 100 parts by weight of the sum of the diene-based rubber polymer, the first monomer mixture, and the second monomer mixture:

the reactive ultraviolet (UV) stabilizer is added in an amount of 0.1 to 2 parts by weight, the diene-based rubber polymer is added in an amount of 15 to 25 parts by weight, and the second monomer mixture is added in an amount of 35 to 45 parts by weight.

2. The method of claim 1, wherein the reactive UV stabilizer is added in an amount of 0.5 parts by weight to 1.2 parts by weight based on 100 parts by weight of the sum of the diene-based rubber polymer, the first monomer mixture, and the second monomer mixture.

3. The method of claim 1, wherein the reactive UV stabilizer is a compound represented by the following Chemical Formula 1:

<Chemical Formula 1>

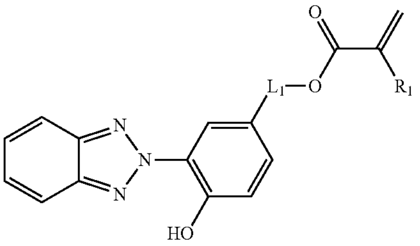

wherein, in Chemical Formula 1, $R_1$ is hydrogen or a $C_1$-$C_{10}$ linear alkyl group, and $L_1$ is a direct bond or a $C_1$-$C_{10}$ linear alkylene group.

4. The method of claim 1, wherein the reactive UV stabilizer is one or more selected from the group consisting of 2-[2'-hydroxy-5'-2-(acryloyloxy)phenyl]-2H-benzotriazole, 2-[2'-hydroxy-5'-2-(methacryloyloxy)phenyl]-2H-benzotriazole, 2-[2'-hydroxy-5'-[2-(acryloyloxy)methyl]phenyl]-2H-benzotriazole, 2-[2'-hydroxy-5'-[2-(methacryloyloxy)methyl]phenyl]-2H-benzotriazole, 2-[2'-hydroxy-5'-[2-(acryloyloxy)ethyl]phenyl]-2H-benzotriazole, 2-[2'-hydroxy-5'-[2-(methacryloyloxy)ethyl]phenyl]-2H-benzotriazole, 2-[2'-hydroxy-5'-[2-(acryloyloxy)propyl]phenyl]-2H-benzotriazole, 2-[2'-hydroxy-5'-[2-(methacryloyloxy)propyl]phenyl]-2H-benzotriazole, 2-[2'-hydroxy-5'-[2-(acryloyloxy)butyl]phenyl]-2H-benzotriazole, 2-[2'-hydroxy-5'-[2-(methacryloyloxy)butyl]phenyl]-2H-benzotriazole, 2-[2'-hydroxy-5'-[2-(acryloyloxy)hexyl]phenyl]-2H-benzotriazole, and 2-[2'-hydroxy-5'-[2-(methacryloyloxy)hexyl]phenyl]-2H-benzotriazole.

5. The method of claim 1, wherein, based on 100 parts by weight of the sum of the diene-based rubber polymer, the first monomer mixture, and the second monomer mixture:

the first monomer mixture is added in an amount of 35 to 45 parts by weight.

6. The method of claim 1, wherein the diene-based rubber polymer has an average particle diameter of 200 nm to 400 nm.

7. The method of claim 1, wherein the composite rubber polymer has an average particle diameter of 250 nm to 450 nm.

8. The method of claim 1, wherein the graft polymer has a refractive index of 1.51 to 1.52.

* * * * *